UNITED STATES PATENT OFFICE.

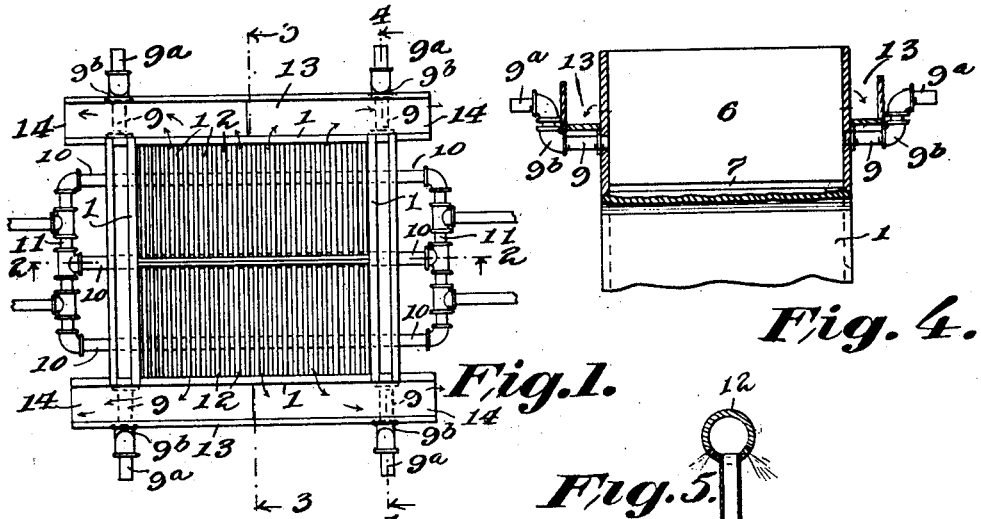
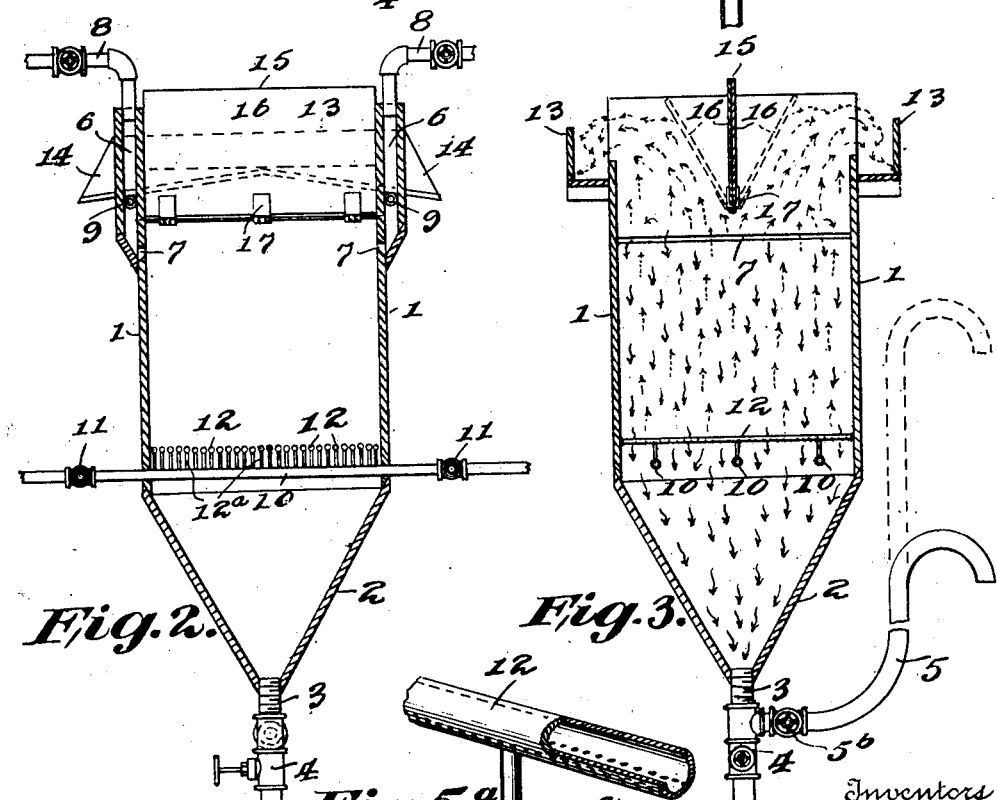

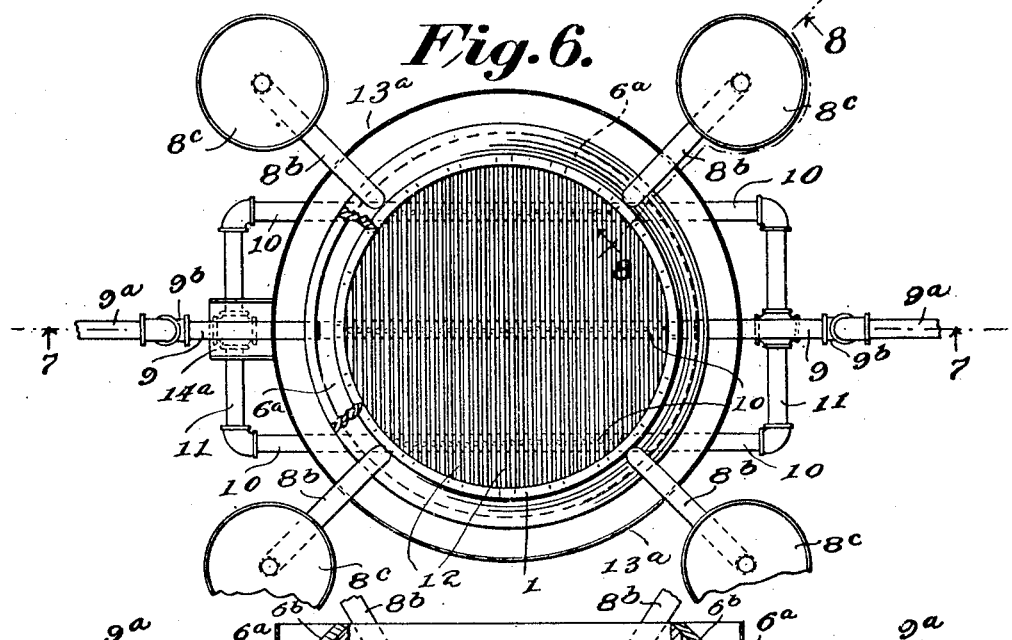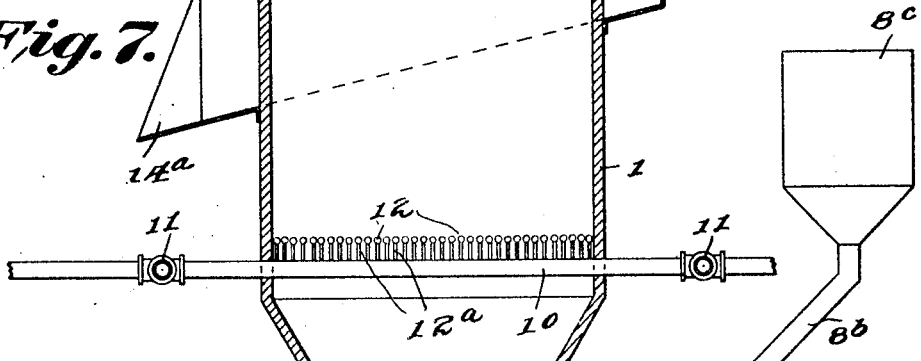

ROBERT SAFFORD TOWNE, OF NEW YORK, N. Y., AND FREDERICK B. FLINN, OF ORANGE, NEW JERSEY, ASSIGNORS, BY MESNE ASSIGNMENTS, TO PNEUMATIC PROCESS FLOTATION COMPANY, OF NEW YORK, N. Y., A CORPORATION OF DELAWARE.

PROCESS OF AND APPARATUS FOR SEPARATING ORE MATERIALS FROM EACH OTHER.

1,367,332. Specification of Letters Patent. Patented Feb. 1, 1921.

Application filed September 12, 1914. Serial No. 861,436.

*To all whom it may concern:*

Be it known that we, ROBERT S. TOWNE and FREDERICK B. FLINN, citizens of the United States, residing at New York and Orange, in the counties of New York and Essex and States of New York and New Jersey, respectively, have invented certain new and useful Improvements in Processes of and Apparatus for Separating Ore Materials from Each Other, of which the following is a specification, reference being had therein to the accompanying drawing.

This invention relates to a process for separating substances having different characteristics. Specifically, the invention is designed for treating ores for the purpose of separating the metalliferous particles from the non-metalliferous particles thereof, and also to improvements in apparatus for carrying out the said process. The process is of the general class in which air or equivalent gaseous body is introduced into a fluid pulp mass in the form of relatively large bubbles which are caused to rise through the mass and to separate particles having certain characteristics from other particles having certain other characteristics; for instance, in metallurgical work, to separate the metalliferous particles from the non-metalliferous particles of the ore mass.

As heretofore proposed by us, in mineral separation, the air was introduced into the pulp body by being forced through a porous plate or septum which served to finely divide it and cause the formation of bubbles. The ore pulp was introduced in one way or another above the plate and was permitted to move downward by gravity and to flow along the plate to a suitable place of discharge. In our earlier work dependence was placed upon the air flowing outward through the septum to keep its surface relatively clean and free from accumulations of ore gangue. But we have found that with some classes of ores the gangue forms a slime which tends to attach itself to the septum and which, after attachment, is not readily removed. The air passages become choked and the formation of air bubbles is retarded to such an extent that the efficiency of the separation is reduced.

When ores of this sort are to be treated it is desirable that the gangue should be permitted to move straight downward along vertical lines without being forced to travel horizontally along a bottom plate. By our present invention we have provided a process by which the ore can move vertically downward to planes below the plane of air introduction thus avoiding the difficulties above referred to; and we have provided an apparatus by which the process can be carried out.

According to our invention there is provided near the bottom of the receptacle containing the pulp a grid having numerous vertical apertures for the downward passage of pulp therethrough and provided with a large number of small passageways which communicate with a source of air supply and serve to deliver the gases as air to the pulp at a large number of uniformly distributed points. In the accompanying drawings we have shown two forms of apparatus adapted for carrying out our novel process.

Of the drawings,

Figure 1 is a plan view showing one form of mechanism;

Fig. 2 is a vertical sectional view taken along the line 2—2 of Fig. 1;

Fig. 3 is a vertical sectional view taken along the line 3—3 of Fig. 1;

Fig. 4 is a fragmentary sectional view taken along the line 4—4 of Fig. 1;

Fig. 5 is an enlarged fragmentary section of one of the air feed pipes;

Fig. 5ª is a perspective view illustrating portions of the air feed pipes;

Fig. 6 is a plan view of a modified form of mechanism;

Fig. 7 is a vertical sectional view taken along the line 7—7 of Fig. 6;

Fig. 8 is a fragmentary view partly in section taken along the line 8—8 of Fig. 6.

Referring to the drawings, especially Figs. 1, 2, 3 and 4, 1 represents the receptacle which as shown is rectangular in cross section and is provided with a pyramidal bottom 2 which terminates in a discharge pipe 3. This pipe is provided with a valve 4 and above the valve is connected a branch pipe 5 which can be a flexible hose and which can be arranged so that the outer end can be adjusted vertically.

At the sides of the receptacle 1 there are feed reservoirs 6, 6, which, at their bottoms, communicate with the reservoir through slots 7, 7, which extend horizontally the full width of the receptacle. The ore is introduced into these reservoirs 6, 6, in any suitable way as, for instance, through the pipes 8, 8. The discharge of ore from the receptacle can be regulated in part by the valve 4 and in part by the position of the end of the pipe 5 or by suitable valves in the pipes 8. It is desirable also to regulate the rate of feed and in this way control to some extent the pulp level. We provide means for regulating the level of the pulp in the reservoirs 6, 6, and consequently regulating the head under which the pulp is delivered through the slots 7, 7. We provide pipes 9, 9, preferably located at the ends of the reservoirs 6, 6, and formed with upper movable sections $9^a$, $9^a$, connected by means of loose joints $9^b$, $9^b$. The loose joints at $9^b$, $9^b$, permit the parts $9^a$, $9^a$ to be swung and thereby raised or lowered, thus raising or lowering the point of overflow of the pulp and the level thereof in the reservoirs.

10, 10 represent air pipes which extend horizontally across the receptacle near the lower part thereof. In the drawings we have shown three such pipes connected at their ends to the manifolds 11, 11, these manifolds in turn being connected by suitable piping with an air compressor or other source of compressed air supply. Connected with the pipes 10, 10 are other similar pipes 12, 12 arranged horizontally and close together across the entire area of the receptacle. These pipes 12, 12 have in addition to the horizontal sections, vertical sections $12^a$ which communicate with the main pipes 10, 10. Each of the horizontal sections is perforated at short intervals throughout its length preferably in the manner indicated in Figs. 5 and $5^a$.

At the top of the main receptacle 1 and adjacent the sides other than those at which the reservoirs 6, 6, are located, are bubble receivers 13, 13. These are provided with sloping bottoms which terminate in discharge spouts 14, 14.

Midway between the bubble receptacles 13, 13 there is preferably located a two-part partition 15 which extends from end to end of the receptacle. The two parts 16, 16 are preferably hinged at 17 so that they can be located either vertically, as shown in full lines in Fig. 3, or inclined as shown by dotted lines in Fig. 3.

In practising the process and using the apparatus in the metallurgical field, for instance, the ore is introduced as before described and the pulp level in the tank is maintained at a plane somewhat above that of the slots 7, 7. Air is led into the pipes 10, 10, and from the pipes 10, 10, into small pipes 12, 12, and out through the small apertures therein. The air emerges into the pulp in more or less fine streams which commingle and produce relatively large bubbles which are substantially uniformly distributed horizontally and these rise through the pulp in succession and contact with and adhere to the metalliferous particles therein. These metalliferous particles are lifted to the top of the pulp. It will be understood that the pulp body as a whole moves slowly downward under the influence of gravity from the plane of introduction at 7, 7, to the point of discharge at 3. The pulp passes freely through the spaces or apertures between the pipes 12, 12, and it is not forced to travel horizontally to seek an outlet. Each particle of ore after being once introduced is permitted to move downward substantially vertically and is caused to contact with a large number of upwardly moving air bubbles. And if the particle be a metalliferous one, it is caught by one or another of the bubbles and lifted to the pulp surface.

The bubbles carrying the metalliferous particles in their films continue to move upward above the top surface of the pulp and the successively emerging bubbles are carried upward by those that follow with the result that there is formed a bubble column extending to the top of the receptacle walls. At these walls these bubbles move outward under the influence of gravity and are discharged into the receivers 13, 13. If desired, the partition boards 16 can be inclined outward, as indicated by dotted lines in Fig. 3, to assist in the outward movement of the bubbles. In the receivers 13, 13 many of the bubbles break up, but those which remain and the liquid resulting from those which have burst, flow by gravity down the inclined bottoms of the receivers and out through the spouts 14, 14.

In Figs. 6, 7 and 8 we have shown a modified form of apparatus in which the main receptacle is circular instead of rectangular. In view of the similarity of this modified apparatus to the apparatus already described, a further detailed description will not be necessary. It is sufficient to point out that the pulp reservoir $6^a$ is similar to the reservoir 6 except that it extends entirely around the receptacle. The overflow devices are similar. The pulp is supplied to the reservoir $6^a$ through pipes $8^b$ from supply tanks $8^c$.

The air supply devices are the same as those already described except for the modifications incident to the modified shape of the receptacle. The bubbles are discharged radially in all directions from the receptacle and are caught by the receiver $13^a$ which terminates in the spout $14^a$. It will be observed that a cover $6^b$ is provided for the top of the reservoir $6^a$, this cover serving to carry the bubbles over the reservoir and into the bubble receiver.

What we claim is:

1. A process for separating substances having different characteristics, said process consisting, essentially, in forming a fluid column of the substance; delivering streams of gaseous medium across the column at such distance above the bottom thereof as to form substantially a quiet zone of substantial depth below the plane of gas introduction, the streams of gas forming uniformly distributed bubbles; causing the bubbles to select and lift a buoyant constituent of said substance; forming a deep mass of laden bubbles about the top surface of the fluid column; permitting the fluid and another and rejected constituent of the substance to pass downward across the horizontal plane of bubble formation on vertical lines uniformly distributed over the entire cross area of the column, and into the zone below the plane of gas introduction; collecting the fluid and said rejected constituents of the substance in said zone; causing the top portion of said bubble column to be discharged from over the fluid body, and withdrawing the fluid and rejected constituent of the substance from said zone.

2. A process for separating substances having different characteristics, said process consisting, essentially, in forming a two-part liquid column, the upper part of said column containing the ingredients of different characteristics and the lower part containing the ingredients of the substance left as the residue after separating the other ingredients; producing masses of bubbles substantially in the horizontal plane of junction of the two parts of the column and distributing said bubbles substantially uniformly across the area of the column at such distance above the bottom thereof that a substantially quiescent zone is formed beneath the plane of bubble introduction; causing the bubbles to select and lift one class of the ingredients in the upper part of the column; permitting the liquid with another and rejected class of ingredients to flow vertically through a plurality of passages distributed across the horizontal plane of bubble formation; withdrawing the liquid and the ingredients of the said rejected class from the quiescent zone of said column; causing the upward rising and laden bubbles to move upward to and beyond the surface of the liquid column; preventing the hydrostatic overflow of liquid at the top of the column, and removing the laden bubbles at horizontal planes above said surface.

3. A process for separating the metalliferous from the non-metalliferous ingredients of an ore mass, said process consisting, essentially, in forming a column of pulp of the ore; delivering streams of a gaseous medium across the column at such distance above the bottom thereof as to form substantially a quiet zone of considerable depth below the plane of gas introduction; the streams of gas forming uniformly distributed bubbles; causing the bubbles to select and lift the metalliferous ore ingredients; forming a column of metal-laden bubbles about the top surface of the pulp; permitting the pulp and barren slimes to pass downward across the horizontal plane of bubble formation on vertical lines uniformly distributed over the entire cross area of the column and into the zone below the plane of gas introduction; collecting the fluid and slime in said zone; causing the top portion of said bubble column to be discharged from over the pulp body; and varying the escape of fluid from said zone to control the downward flow across the plane of bubble formation.

4. The herein described process for separating the metalliferous from the non-metalliferous ingredients of an ore mass, said process consisting, essentially, in forming a two-part fluid column, the upper part of said column containing both of the said ingredients and the lower part containing the non-metalliferous ingredients of the ore left as a residue after separating the metalliferous ingredients; delivering streams of a gaseous medium in the horizontal planes of junction of the two parts of the column, the streams of gas forming bubbles which are distributed substantially uniformly across the area of the column at such distance above the bottom thereof that a substantially quiescent zone is formed beneath the plane of gas distribution; causing the bubbles to lift the metalliferous ingredients of the ore in the upper part of the column; permitting the fluid with the non-metalliferous ingredients to flow vertically through a plurality of passages distributed across the horizontal plane of bubble formation; withdrawing the water and non-metalliferous particles from the quiescent zone of said column; causing the upward rising metal-laden bubbles to move upward to and beyond the surface of the pulp column; preventing the hydrostatic overflow of fluid at the top of the column, and removing the metal-laden bubbles at horizontal planes above said surface.

5. The herein described process for separating the metalliferous from the non-metalliferous ingredients of an ore mass, which consists in forming a fluid column, introducing into the upper part of said column a pulp containing ore, dividing the ore mass at a point a substantial distance above the bottom thereof to form air bubbles in an area across the said column at horizontal planes above the bottom and below the top of the column, and at such distance above said bottom as to form a substantially quiet zone below the point of air distribution, causing the bubbles to act, from the horizontal planes of their formation, upward in lifting the metalliferous ingredients of the ore, permitting the non-metalliferous ingredients of the ore and the fluid to pass to that part of the column which is below the horizontal planes of bubble formation, temporarily arresting the escape of the non-metalliferous ingredients and the water after passing below said planes, discharging the water and the non-metalliferous particles from the column at horizontal planes below those aforesaid, causing the flow of the discharge to establish the height of the fluid column, causing the metal laden bubbles to rise to, and to points above, the top surface of the fluid column, and causing the removal of the laden bubbles at a plane above that of said top surface.

6. A separatory flotation cell having a tailings outlet at the lower portion and a froth overflow at the upper portion, and a row of closely spaced, stationary, parallel arms extending across said cell a distance above the bottom thereof, said arms being foraminous and so closely spaced as to permit the passage and cause commingling of a gaseous medium, and means for admitting a gaseous medium to said arms, said cell adapted to maintain the zone occupied by said arms free from settled solids.

7. A separatory flotation cell having a tailings outlet at the lower portion and a froth overflow at the upper portion, a row of stationary, spaced parallel arms extending transversely across said cell a distance above the bottom thereof, said arms being foraminous and so closely spaced as to permit the passage and cause commingling of a gaseous medium, said arms being at such distance above the bottom of the cell as to form a settling zone of substantial depth below the plane of gas introduction, and means for admitting a gaseous medium to said arms, said cell adapted to maintain the zone occupied by said arms free from settled solids.

8. A separatory flotation cell having a tailings outlet at the lower portion and a froth overflow at the upper portion, a row of spaced parallel arms extending transversely across said cell a distance from the bottom thereof, said arms being porous and oppositely presented portions of the arms being so spaced as to discharge commingling jets of a gaseous medium, and said cell adapted to maintain the zone occupied by said arms free from settled solids, and means for supplying a gaseous medium to said arms.

9. A frothing separator comprising a cell having a tailings outlet at the lower portion and provision for discharging froth at the upper portion and a series of tubes collectively constituting a fixed tubular grating extending across said cell a distance above the bottom thereof, said tubes having surfaces adapted to discharge streams of a gaseous medium in a finely divided state, and said tubes being so spaced as to cause said streams to reach all portions of the liquid above said grating, while permitting the free downward passage of solids between the tubes, whereby the zone occupied by said grating is maintained substantially free from settled solids.

10. A frothing separator comprising a cell having a tailings outlet at the lower portion and provision for discharging froth at the upper portion, and a series of tubes collectively constituting a fixed tubular grating extending across said cell a distance above the bottom thereof, said tubes having surfaces adapted to discharge streams of a gaseous medium in a finely divided state, and said tubes being so spaced as to cause the streams to reach all portions of the liquid above said grating, while permitting the free downward passage of solids between the tubes, whereby the zone occupied by said grating is maintained substantially free from settled solids.

11. A frothing separator comprising a cell having a tailings outlet at the lower portion and provision for discharging froth at the upper portion, and a series of tubes substantially circular in cross section and collectively constituting a fixed tubular grating extending across said cell a distance above the bottom thereof, said tubes having surfaces adapted to discharge streams of a gaseous medium in a finely divided state, and said tubes being so spaced as to cause said streams to reach all portions of the liquid above said grating, while permitting the free downward passage of solids between the tubes, whereby the zone occupied by said grating is maintained substantially free from settled solids.

12. A frothing separator comprising a cell having a tailings outlet at the lower portion and provision for discharging froth at the upper portion, and a series of tubes between the walls of said cell and collectively constituting a fixed tubular grating extending across said cell a distance above the bottom thereof, said tubes having surfaces adapted to discharge streams of a gaseous medium in a finely divided state, and said tubes being so spaced as to cause said streams to reach all portions of the liquid above said grating, while permitting the free downward passage of solids between the tubes, whereby the zone occupied by said grating is maintained substantially free from settled solids.

13. A frothing separator comprising a cell having a tailings outlet at the lower portion and provision for discharging froth at the upper portion, and a series of tubes collectively constituting a fixed tubular grating extending across said cell a distance above the bottom thereof, said tubes having surfaces to permit the passage therethrough of gases and liquid but not of solids and adapted to discharge streams of a gaseous medium in a finely divided state, and said tubes being so spaced as to cause said streams to reach all portions of the liquid above said grating, while permitting the free downward passage of solids between the tubes, whereby the zone occupied by said grating is maintained substantially free from settled solids.

14. A separatory flotation cell having a tailings outlet at the lower portion and a froth overflow at the upper portion, a row of spaced parallel arms extending transversely across said cell a distance above the bottom thereof, said arms having oppositely presented portions so spaced as to discharge commingling jets of a gaseous medium, and said cell adapted to maintain the zone occupied by said arms free from settled solids.

In testimony whereof we affix our signatures in presence of two witnesses.

ROBERT SAFFORD TOWNE.
FREDERICK B. FLINN.

Witnesses:
DAVID SCOTT,
R. E. SAFFORD.